United States Patent
Wu et al.

(10) Patent No.: US 10,242,106 B2
(45) Date of Patent: Mar. 26, 2019

(54) ENHANCE SEARCH ASSIST SYSTEM'S FRESHNESS BY EXTRACTING PHRASES FROM NEWS ARTICLES

(71) Applicant: Yahoo! Inc., Sunnyvale, CA (US)

(72) Inventors: Hui Wu, Sunnyvale, CA (US); Shenhong Zhu, Santa Clara, CA (US); Kazuhiro Nakao, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 306 days.

(21) Appl. No.: 14/574,221

(22) Filed: Dec. 17, 2014

(65) Prior Publication Data

US 2016/0179961 A1  Jun. 23, 2016

(51) Int. Cl.
*G06F 17/30* (2006.01)

(52) U.S. Cl.
CPC .... *G06F 17/30867* (2013.01); *G06F 17/3053* (2013.01); *G06F 17/3064* (2013.01)

(58) Field of Classification Search
CPC ........... G06F 17/30867; G06F 17/3064; G06F 17/3053; G06F 17/30011; G06F 17/30637; G06F 17/30643
USPC ....... 707/721, 728, 739, 767, 748, 751, 758, 707/769, 917, E17.063, E17.108; 715/780
See application file for complete search history.

(56) References Cited

U.S. PATENT DOCUMENTS

| | | | | |
|---|---|---|---|---|
| 5,278,980 A * | 1/1994 | Pedersen | ........... | G06F 17/30011 |
| 6,564,213 B1 * | 5/2003 | Ortega | ................ | G06F 17/3064 |
| 6,772,150 B1 * | 8/2004 | Whitman | .......... | G06F 17/30448 |
| | | | | 707/721 |
| 7,747,607 B2 * | 6/2010 | Parikh | ................. | G06F 17/3064 |
| | | | | 707/713 |
| 7,779,009 B2 * | 8/2010 | Chowdhury | ...... | G06F 17/30657 |
| | | | | 707/737 |
| 8,200,687 B2 * | 6/2012 | Gupta | ............... | G06F 17/30867 |
| | | | | 707/737 |
| 8,712,868 B2 * | 4/2014 | Foster | .................... | G06Q 30/02 |
| | | | | 705/26.7 |
| 9,430,573 B2 * | 8/2016 | Bailey | ............... | G06F 17/30867 |
| 2004/0236736 A1 * | 11/2004 | Whitman | .......... | G06F 17/30448 |
| 2005/0246330 A1 * | 11/2005 | Giang | ............... | G06F 17/30489 |
| 2007/0067289 A1 * | 3/2007 | Novak | ................ | G06F 17/2775 |
| 2011/0184951 A1 * | 7/2011 | Paparizos | ......... | G06F 17/30864 |
| | | | | 707/737 |

(Continued)

OTHER PUBLICATIONS

Wikipedia, "Autocomplete," Sep. 4, 2014, downloaded from http://en.wikipedia.org/wiki/Autocomplete.

(Continued)

*Primary Examiner* — Greta L Robinson
(74) *Attorney, Agent, or Firm* — Weaver Austin Villeneuve & Sampson LLP

(57) ABSTRACT

In one embodiment, a portion of a search query may be obtained from a client device. A set of suggested search queries may be obtained or generated from a plurality of phrases stored in memory, where the portion of the search query matches a portion of each suggested search query in the set of suggested search queries. The set of suggested search queries may be provided to the client device. The plurality of phrases may include phrases extracted from documents published via a network.

23 Claims, 9 Drawing Sheets

(56) References Cited

U.S. PATENT DOCUMENTS

| | | | |
|---|---|---|---|
| 2011/0191364 A1* | 8/2011 | LeBeau | G06F 17/30672 |
| | | | 707/767 |
| 2013/0073382 A1* | 3/2013 | Henkin | G06Q 30/02 |
| | | | 705/14.49 |
| 2014/0040275 A1* | 2/2014 | Dang | G06F 17/2785 |
| | | | 707/741 |
| 2016/0162502 A1* | 6/2016 | Zhou | G06F 17/3097 |
| | | | 707/722 |

OTHER PUBLICATIONS

D. Beeferman and A. Berger. Agglomerative clustering of a search engine query log. In *KDD*, 2000.

D. Bollegala, Y. Matsuo, and M. Ishizuka. Measuring semantic similarity between words using web search engines. In *WWW*, 2007.

A. Budanitsky and G. Hirst. Evaluating wordnet-based measures of lexical semantic relatedness. *Computational Linguistics*, 2006.

S. Chien and N. Immorlica. Semantic similarity between search engine queries using temporal correlation. In *WWW*, 2005.

K. Church and B. Thiesson. The wild thing! in *ACL*, 2005.

D. R. Cutting, D. R. Karger, J. 0. Pedersen, and J. W. Tukey. Scatter/Gather: A cluster-based approach to browsing large document collections. In *SIGIR'92*, pp. 318-329, 1992.

S. Dumais, E. Cutrell, and H. Chen. Optimizing search by showing results in context. In *CHI*, 2001.

N. Glance. Community search assistant. In */U/*, 2001.

R. Jones, B. Rey, 0. Madni, and W. Greiner. Generating query substitutions. In *WWW*, 2006.

G. Li, S. Ji, C. Li, and J. Feng. Efficient type-ahead search on relational data: a tastier approach. In *SIGMOD*, 2009.

D. Lin. Automatic retrieval and clustering of similar words. In *ACL*, 1998. _.

Q. Mei, D. Zhou, and K. Church. Query suggestion using hitting time. In *CIKM*, 2008.

P. Pantel and D. Ravichandran. Automatically labeling semantic classes. In *HLT-NAACL*, 2004.

M. Sahami and T. Heilman. A Web-based kernel function for measuring the similarity of short text snippets. In *WWW*, 2006.

P. Treeratpituk and J. Callan. Automatically labeling hierarchical clusters. In *DG 06*, 2006.

P. D. Turney. Mining the web for synonyms: Pmi-ir versus lsa on toefl. In *ECML*, 2001.

J.-R. Wen, J.-Y. Nie, and H.-J. Zhang. Query clustering using user logs. *ACM Transactions on Information Systems*, 2002.

W.-T. Yih and C. Meek. Improving similarity measures for short segments of text. In *IAAI*, 2007.

Z. Zhang and 0. Nasraoui. Mining search engine query logs for query recommendation. In *WWW*, 2006.

You Tube Adds Query Suggestions for Search. Search Marketing News Blog, http://blog.searchenginewatch.com/080519-101916 printed Dec. 23, 2009.

B. Slawski, Predictive Search Query Suggestions, May 8, 2009, http://www.seobythesea.com/?p+1375, printed Dec. 23, 2009.

* cited by examiner

US 10,242,106 B2

ENHANCE SEARCH ASSIST SYSTEM'S FRESHNESS BY EXTRACTING PHRASES FROM NEWS ARTICLES

BACKGROUND OF THE INVENTION

The disclosed embodiments relate generally to computer-implemented generation and presentation of suggested phrases including search queries.

Autocomplete is a feature provided by many web browsers, e-mail programs, and search-engine interfaces. The autocomplete feature completes a word or phrase that a user is typing without the user typing in the word or phrase completely.

In search engines, an autocomplete user interface feature typically provides users with suggested queries as they type their query in the search box. This type of feature often relies on matching algorithms that forgive entry errors. Such matching algorithms may search popular search query lists to identify those queries that most closely match the text that has been typed in the search box.

SUMMARY OF THE INVENTION

The disclosed embodiments enable suggested phrases such as suggested search queries to be obtained or generated from a plurality of phrases that include phrases extracted from documents published via a network such as the Internet. For example, the documents may include news articles, magazine articles, or blogs.

In one embodiment, a portion of a search query may be obtained from a client device. A set of suggested search queries may be obtained or generated from a plurality of phrases stored in memory, where the portion of the search query matches a portion of each suggested search query in the set of suggested search queries. The set of suggested search queries may be provided to the client device. The plurality of phrases may include phrases extracted from documents published via a network.

In another embodiment, a first plurality of phrases may be extracted from a plurality of documents published via a network. For each of the first plurality of phrases, an importance score may be generated or updated such that the importance score is stored in association with the corresponding one of the first plurality of phrases. A set of suggested phrases may be identified based, at least in part, upon the importance score associated with each of at least a subset of the first plurality of phrases. The set of suggested phrases may include one or more phrases from the first plurality of phrases. The set of suggested phrases may then be provided.

In yet another embodiment, a first plurality of phrases may be extracted from a plurality of documents published via the Internet. For each of the first plurality of phrases, an importance score may be generated or updated such that the importance score is stored in association with the corresponding one of the first plurality of phrases. A second plurality of phrases may be identified from one or more search logs, wherein each of the second plurality of phrases includes at least a portion of a search query that was previously submitted via a search engine. For each of the second plurality of phrases, an importance score may be obtained such that the importance score is stored in association with the corresponding one of the second plurality of phrases, wherein the importance score for the corresponding one of the second plurality of phrases indicates a popularity of the one of the second plurality of phrases as a search query submitted via a search engine. A set of suggested phrases may be identified based, at least in part, upon the importance score associated with each of at least a subset of the first plurality of phrases and/or the importance score associated with each of at least a subset of the second plurality of phrases, wherein the set of suggested phrases includes at least one of the first plurality of phrases and/or at least one of the second plurality of phrases. The set of suggested phrases may then be provided.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
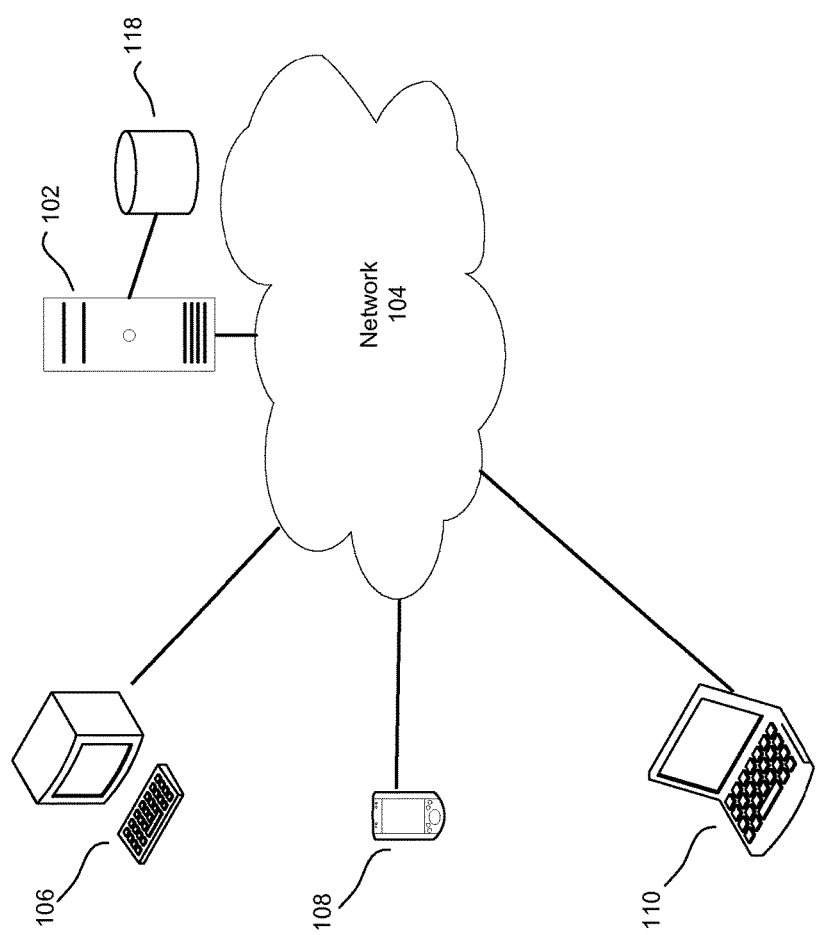
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

Search engines often offer a search suggestion tool that helps users complete their query faster by predicting the next characters and words they will type. For example, as a user starts typing "sacr.," a drop-down window typically appears under the search box offering common completions and relevant suggestions such as "sacramento," "sacramento airport," and "sacred heart." The user can then simply select from the list instead of typing in the complete search query.

Typically, search suggestions are identified from search logs. Since the search suggestions are limited by the scope and nature of the search queries that were previously submitted, trending topics such as current news stories or events will not be presented in the form of suggested search queries by current search assist systems.

In accordance with various embodiments, search suggestions may be generated and provided based, at least in part, upon phrases extracted from documents published via the Internet. Such documents may include, but are not limited to, news articles or blogs. The terms "suggestion," "search suggestion," and "suggested search query" are used interchangeably.

Example System

FIG. 1 is a diagram illustrating an example system in which various embodiments may be implemented. As shown in FIG. 1, the system may include one or more servers 102 associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, the server(s) 102 may include a web server, search server, and/or content server.

The server(s) 102 may provide targeted content to users of the web site. A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

In addition, the server(s) 102 may provide suggested search queries for presentation via a device. In some embodiments, the suggested search queries may be provided upon receiving a request for the suggested search queries from the device. For example, the request may include a portion of a search query that has been entered by a user in a search box of a user interface of the device. As another example, the request may simply include an indication that a user has switched to a search box of a user interface presented via the device. Thus, the server(s) 102 may receive a portion of a search query from the device. Where the request includes a portion of a search query, the server(s) may generate the suggested search queries based, at least in part, upon the portion of the search query. Various methods of generating suggested search queries will be described in further detail below.

A plurality of clients 106, 108, 110 may access a search application, for example, on a search server via network 104 and/or access a web service, for example, on a web server via a graphical user interface. The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via the network 104 and related to a search query including one or more search terms. More particularly, a graphical user interface including an input feature (e.g., input box, search box, or search query section) is presented to the client. Typically, the graphical user interface may present an input feature into which a user may type at least a portion of a search query including any number of search terms or portion thereof. The terms "input feature," "input box," "search box," and "search query section" may be used interchangeably.

Companies are increasingly exploring ways to reduce user efforts in performing search-related tasks via search engines. Such efforts have resulted in the widely used auto-completion mechanism that automatically suggests possible completions of search queries while users are formulating their queries. However, current auto-complete mechanisms generate suggested search queries based solely upon search logs. As a result, suggested search queries cannot capture trending or current topics, thereby limiting the quality of search assist systems.

In accordance with various embodiments, a user may type a search query or portion thereof into the input feature of the graphical user interface. Suggested search queries (i.e., search suggestions) may then be automatically generated based, at least in part, upon phrases extracted from documents published on the Internet. The suggested search queries may be presented to the user. The user may then select one of the suggested search queries to submit to a search engine via the graphical user interface.

The search query may then be executed via one or more search applications (e.g., associated with search server and/or web server) and/or one or more data sources. Embodiments of the present invention may be employed with respect to any search application. The search application may be implemented on any number of servers although only a single server 102 is illustrated for clarity.

Upon receiving a search query, the search server 102 may identify and present the appropriate search results. For instance, the search server 102 may identify and present a plurality of hypertext links that identify content that is pertinent to the search query, as well as present a summary or abstract associated with the plurality of hypertext links.

Embodiments disclosed herein may be implemented via the search server (or other server) 102 and/or the clients 106, 108, 110. For example, various features may be implemented via a web browser and/or application on the clients 106, 108, 110. The disclosed embodiments may be implemented via software and/or hardware.

As will be described in further detail below, generation of suggested queries may be performed by the server(s) 102 based, at least in part, upon phrases extracted from documents published via a network such as the Internet. In addition, the suggested queries may be generated further based, at least in part, upon previously submitted search queries identified via a search log.

In some embodiments, suggested search queries may be further identified based, at least in part, upon a context of the user. The context of the user may include geographic information such as a location from which the user is browsing. The context may also include information obtained or derived from a user profile. More particularly, the user profile may include information indicating the user's explicitly declared interests and/or inferred interests that are inferred from user behavior. Examples of information that may be maintained in a user profile will be described in further detail below.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user, which may be explicitly declared by the user and/or implicitly derived by the system.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs.

For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), and/or a timestamp may be retained in the query logs.

Figure 2:
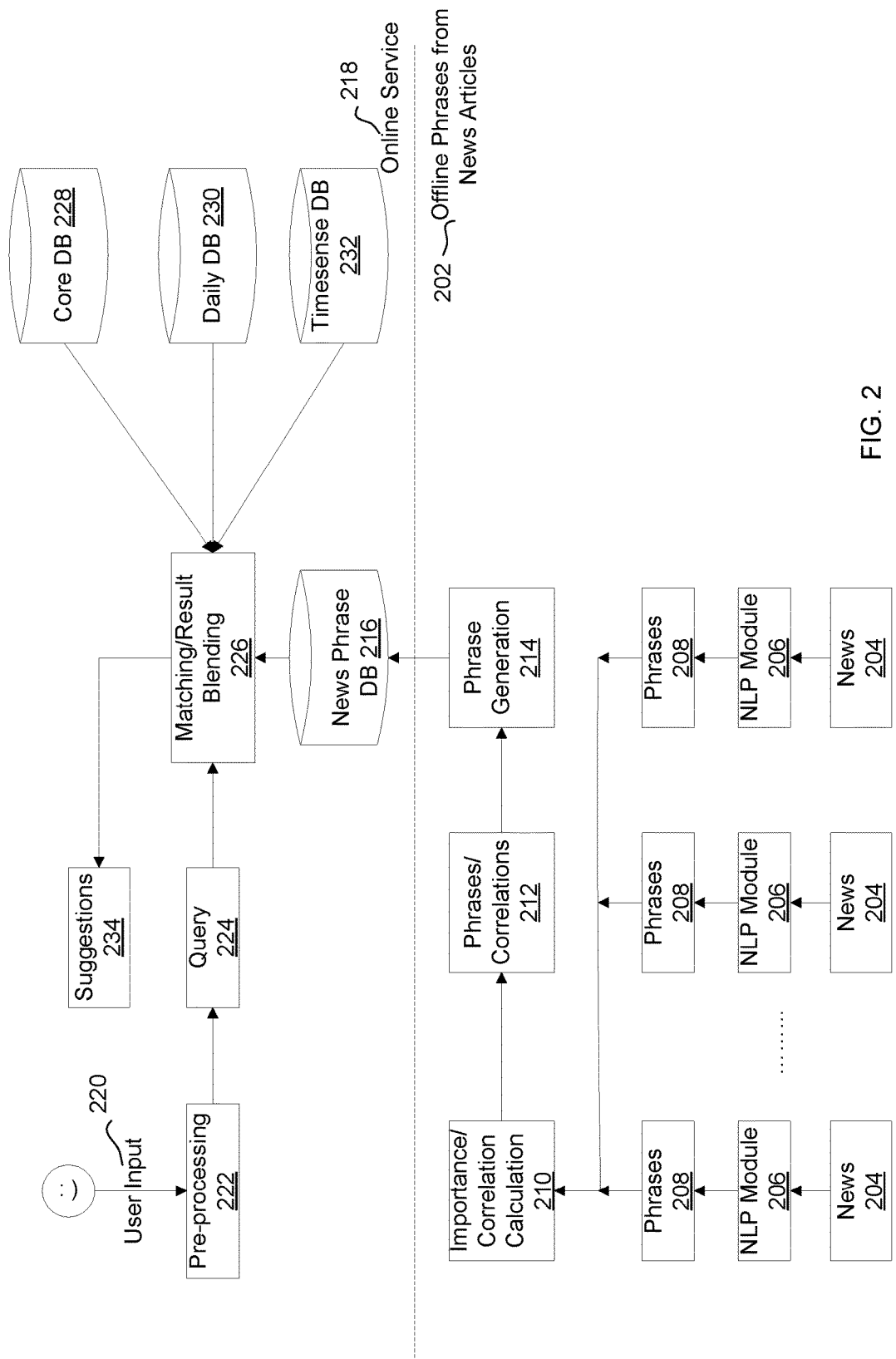
FIG. 2 is a diagram illustrating an example search assist recommendation system that may be implemented in accordance with various embodiments.

FIG. 2 is a diagram illustrating an example search assist recommendation system that may be implemented in accordance with various embodiments. As discussed above, suggested queries may be generated based, at least in part, upon documents published via a network such as the Internet. For example, the documents may include news articles. To generate the suggested queries, the documents may be parsed to obtain and store phrases from the documents. While the phrases may be obtained during online processing, online processing resources may be conserved by obtaining and storing phrases from the documents during offline processing. Stated another way, the phrases may be extracted from documents and stored prior to receiving using input that triggers the generation of suggested queries.

In accordance with various embodiments, at least a portion of the system processing may be performed offline, as shown at 202 in the bottom segment of FIG. 2. More particularly, documents such as news articles 204 may be processed at 206 via processing techniques such as natural language processing (NLP) techniques to extract phrases 208 from the news articles 204. For example, the NLP techniques may include Named Entity Recognition (NER), part-of-speech tagging, and/or a grammar parsing. NER may identify entities such as individuals, locations, organizations, dates, times, events, physical objects, and/or virtual objects. Part-of-speech tagging and/or grammar parsing may enable noun phrases and/or verb phrases to be identified. The phrases 208 may be stored in memory, or may be further processed.

In this example, the phrases 208 that have been extracted from the news articles 204 may be further processed to perform importance and/or correlation calculations 210. More particularly, each of the phrases 208 may be assigned an importance score. In addition, any combination of two or more of the phrases 208 may be processed to determine a correlation score for the combination of two or more phrases. Based upon the importance scores and correlation scores, phrases having a high importance and/or combinations of phrases having a high correlation score may be identified at 212. Potential suggested phrases may be generated or otherwise obtained at 214 from those phrases identified as having a high importance and/or combinations of phrases identified as having a high correlation score. For example, where two or more phrases are identified as having a high correlation, those phrases may be combined into a single potential suggested phrase. The importance scores associated with the two or more phrases may be combined to assign the resulting single potential suggested phrase a corresponding importance score. The potential suggested phrases may then be stored for later retrieval. The potential suggested phrases may be stored to a database such as News Phrase database (DB) 216. Each potential suggested phrase may be stored in association with its corresponding importance score.

As discussed above, a high correlation score may indicate a strong correlation between two or more phrases obtained from documents. As a result, it may be desirable to combine those phrases into a single potential suggested phrase. In this example, a correlation score is ascertained for phrases extracted from documents published via the network. However, correlation scores indicating correlations between and among phrases need not be limited to phrases obtained from the documents. In other embodiments, correlations scores may be obtained for any combination of two or more phrases, where those phrases are obtained from documents and/or previously submitted queries identified from search logs. As a result, any set of two or more phrases having a high correlation score may be combined to generate a single suggested phrase.

System processing may be performed by an online service 218 in response to user input 220, as shown in the upper portion of FIG. 2. The user input 220 may be interpreted by the system as including a portion of a search query. Prior to submission of the search query, the system may perform pre-processing 222 of the user input (e.g., portion of the search query). For example, the pre-processing 222 may include spell check to correct typographical errors in the user input. Based upon the user input, the system may query 224 its phrase resources based upon the portion of the search query. More particularly, the system may identify a set of phrases in its phrase resources that match the portion of the search query and blend the identified phrases as described herein, as shown at 226. For example, the portion of the search query may match a pre-fix of each phrase in the set of phrases. As shown in this example, the phrase resources may include phrases obtained from published documents such as those stored in the News Phrase DB 216. In addition, the phrase resources may include phrases obtained from one or more search log(s). In this example, search logs may include a Core DB 228 that stores previously submitted queries received over the past 2 years, a Daily DB 230 that stores previously submitted queries received over the past 7 days, and/or a Timesense DB 232 that stores previously submitted queries received over the past hour.

Blending of the identified phrases to generate a set of suggested search queries may be performed according to a set of rules. Where an individual phrase satisfies a rule in the set of rules, the individual phrase may be added as a suggested search query to a set of suggested search queries 230. Conversely, where an individual phrase does not satisfy a rule, the individual phrase may be excluded from the set of suggested search queries 230. A set of two or more phrases may together satisfy a rule in the set of rules. In such instances, a set of two or more phrases may be combined to generate a single suggested search query, as will be described in further detail below.

One or more rules used to generate a set of suggested search queries may be statically defined. In addition, such rules may be generated via a machine learning model.

The suggested search queries 230 may include phrases obtained from published documents and/or phrases obtained from search log(s). More particularly, each suggested search query may include one or more phrases obtained from published documents and/or one or more phrases obtained from search log(s).

Although the above-described embodiment relates to the presentation of suggested search queries in response to the receipt of a portion of a search query, this example is merely illustrative. Thus, it is also possible to recommend suggested search queries in the absence of the receipt of a portion of a search query. For example, suggested phrases may be generated based, at least in part, upon other information such as a user's context.

Figure 3A:
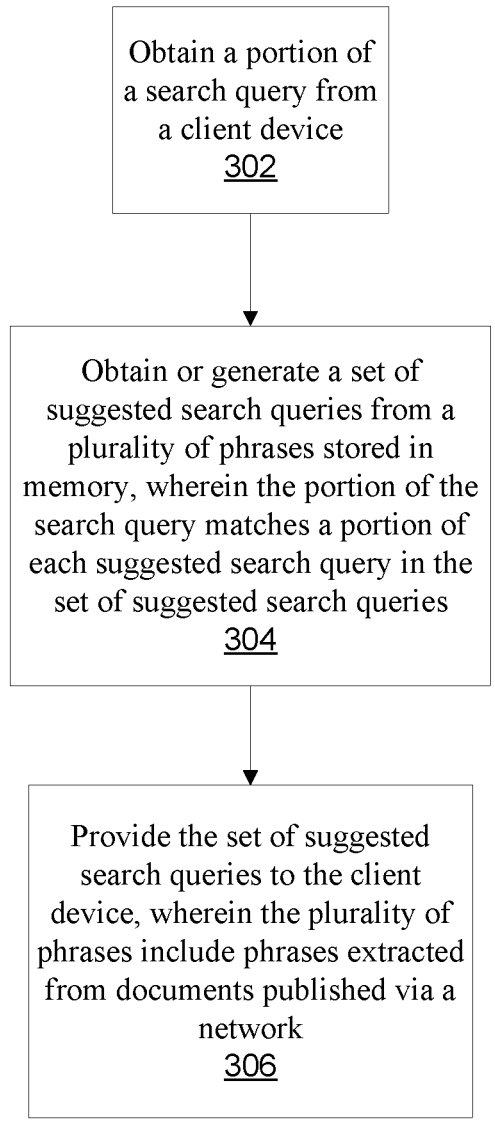
FIG. 3A is a process flow diagram illustrating an example method of providing suggested search queries in accordance with various embodiments.

FIG. 3A is a process flow diagram illustrating an example method of providing suggested search queries in accordance with various embodiments. A portion of a search query may be obtained at 302. For example, a user may type the portion of the search query into an input box of a user interface associated with a search application. Thus, the portion of the search query may be obtained via a client device, and subsequently obtained by a server.

Since the search query or portion thereof has not been submitted by the user via a search application, the portion of the search query may be automatically transmitted to the server by the client device or otherwise obtained by the server each time the portion of the search query is modified by the user. In other words, a request including the portion of the search query may be automatically transmitted by the client device to the server each time the portion of the search query is modified by the user.

A set of suggested search queries may be obtained or generated from a plurality of phrases stored in memory at 304. More particularly, the portion of the search query may match a portion of each suggested search query in the set of suggested search queries. The plurality of phrases may include phrases extracted from documents published via a network such as the Internet. For example, the documents may include news articles or magazine articles.

In accordance with various embodiments, the plurality of phrases may include phrases extracted from documents published via a network and phrases obtained from previously submitted search queries identified from at least one search log. Thus, each suggested search query in the set of suggested search queries may include at least one of the phrases extracted from the documents published via the network and/or at least one of the phrases obtained from the previously submitted search queries.

The set of suggested search queries may be obtained or generated based, at least in part, upon an importance score associated with each of the plurality of phrases. The importance score associated with each of the phrases extracted from the documents may be generated based, at least in part, upon a number of the documents in which the phrase occurs, an importance of the documents in which the phrase occurs, and/or a number of occurrences of the phrase in each of the documents in which the phrase occurs. The importance score associated with each of the phrases obtained from the previously submitted search queries may indicate a popularity of the phrase as a search query submitted via a search engine.

In some embodiments, correlation scores associated with various sets of two or more of the plurality of phrases may be ascertained. Where a given set of two or more phrases is determined to have a high correlation score, the two or more phrases may be combined such that a single suggested search query is generated. For example, where a correlation score associated with a set of two or more phrases is determined to be above a particular threshold value, the two or more phrases may be combined to generate a single suggested search query.

The set of suggested search queries may be provided at 306. More particularly, the set of suggested search queries may be provided by a server to a client device. The client device may display the set of suggested search queries for selection by a user. The user may then select a suggested search query from the set of suggested search queries and submit the selected suggested search query via the search application. The search application may then return search results corresponding to the selected suggested search query.

Figure 3B:
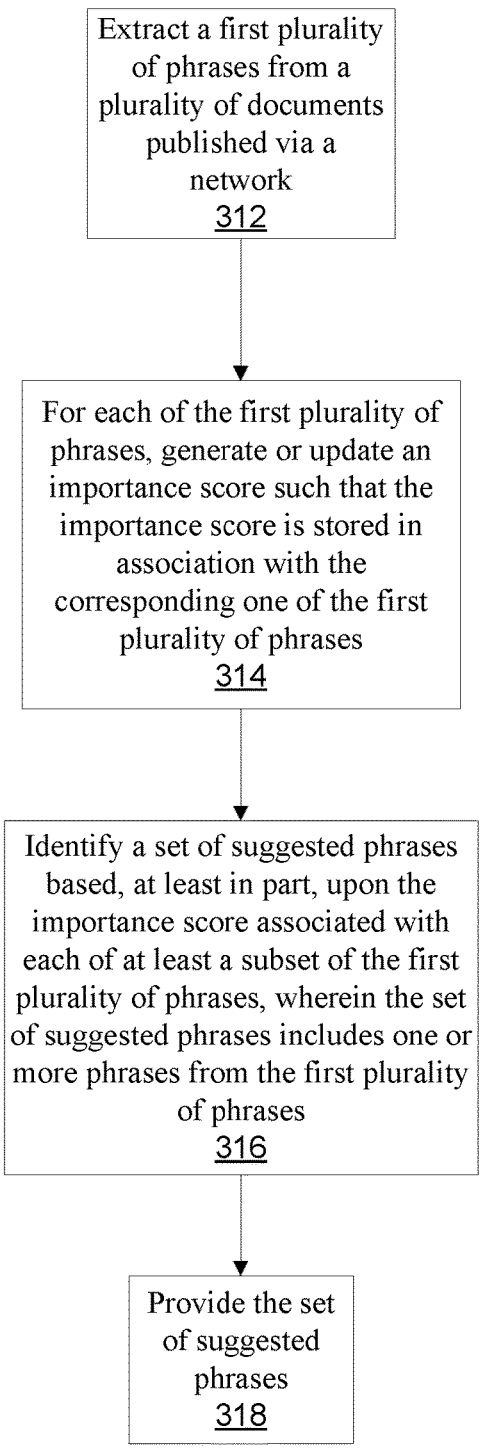
FIG. 3B is a process flow diagram illustrating another example method of providing suggested phrases accordance with various embodiments.

FIG. 3B is a process flow diagram illustrating another example method of providing suggested phrases accordance with various embodiments. A first plurality of phrases may be extracted from a plurality of documents published via a network such as the Internet at 312. For example, the plurality of documents may include news articles and/or magazine articles. Extraction of the first plurality of phrases from the plurality of documents may include identifying entities, noun phrases, and/or verb phrases within the documents.

For each of the first plurality of phrases, an importance score may be generated or updated at 314 such that the importance score is stored in association with the corresponding one of the first plurality of phrases. More particularly, the importance score may be generated based, at least in part, upon a number of the documents in which the phrase occurs, an importance of the documents in which the phrase occurs, and/or a number of occurrences of the phrase in each of the documents in which the phrase occurs.

A set of suggested phrases may be identified at 316 based, at least in part, upon the importance score associated with each of at least a subset of the first plurality of phrases. As described above, where a portion of a search query has been obtained (e.g., via a search box of a user interface), the set of suggested phrases may be identified based, at least in part, upon the importance score associated with each phrase in the subset of the first plurality of phrases for which the portion of the search query matches a portion (e.g., prefix) of the phrase. Accordingly, the portion of the search query may match a portion of each suggested search query in the set of suggested search queries.

In accordance with various embodiments, correlation scores associated with sets of two or more phrases may be ascertained and the set of suggested phrases may be identified based, at least in part, upon the correlation scores. More particularly, a set of two or more phrases having a high correlation score may be combined to generate a single suggested phrase.

A high correlation score associated with a set of two or more phrases may indicate the co-existence of the two or more phrases in a large number of documents. Thus, the high correlation score may indicate a strong relationship between the two or more phrases. In some instances, the high correlation score may indicate a high degree of similarity between the two or more phrases.

In one embodiment, for each of the first plurality of phrases, a boolean vector representing the phrase may be associated with the corresponding one of the first plurality of phrases, where the boolean vector includes a plurality of values (e.g., dimensions), where each one of the plurality of values corresponds to one of the plurality of documents and indicates whether the one of the first plurality of phrases appears in the corresponding one of the plurality of documents. For example, $<b_1, b_2, b_3, \ldots, b_n>$ may represent a boolean vector for a phrase p, where $b_i$ indicates whether the phrase p appears in the i-th document. In one embodiment, if the phrase appears in the i-th document, the value of $b_i$ is 1, otherwise the value of $b_i$ is 0. A correlation between pairs of phrases may be determined based upon their corresponding boolean vectors such that a correlation score for each of the pairs of phrases is generated. Each pair of phrases may include phrases from the first plurality of phrases. More particularly, for each of the pairs of phrases, a cosine similarity between the corresponding boolean vectors may be calculated such that the correlation score for the corresponding one of the pairs of phrases is generated.

The set of suggested phrases may be generated based, at least in part, upon the correlation score for each of the pairs of phrases. For example, a pair of phrases having a high correlation score may be combined such that a single suggested phrase is generated.

In accordance with various embodiments, a set of rules may be applied to generate the set of suggested phrases. Where a phrase or set of two or more phrases satisfies a rule in the set of rules, the phrase or set of two or more phrases may be added to the set of suggested phrases. Example rules are as follows: 1) The phrase is a person entity, and the phrase appears in at least 2 documents. 2) The phrase is a noun phrase, and it has a high correlation to at least one person entity. Where a noun phrase and a person entity has a very high correlation, a new suggested phrase may be generated to include "noun phrase+person" and/or "person+noun phrase."

The set of suggested phrases may be provided at 318. For example, the set of suggested phrases may be provided by a server to a client device. The set of suggested phrases may include one or more phrases from the first plurality of phrases.

Figure 3C:
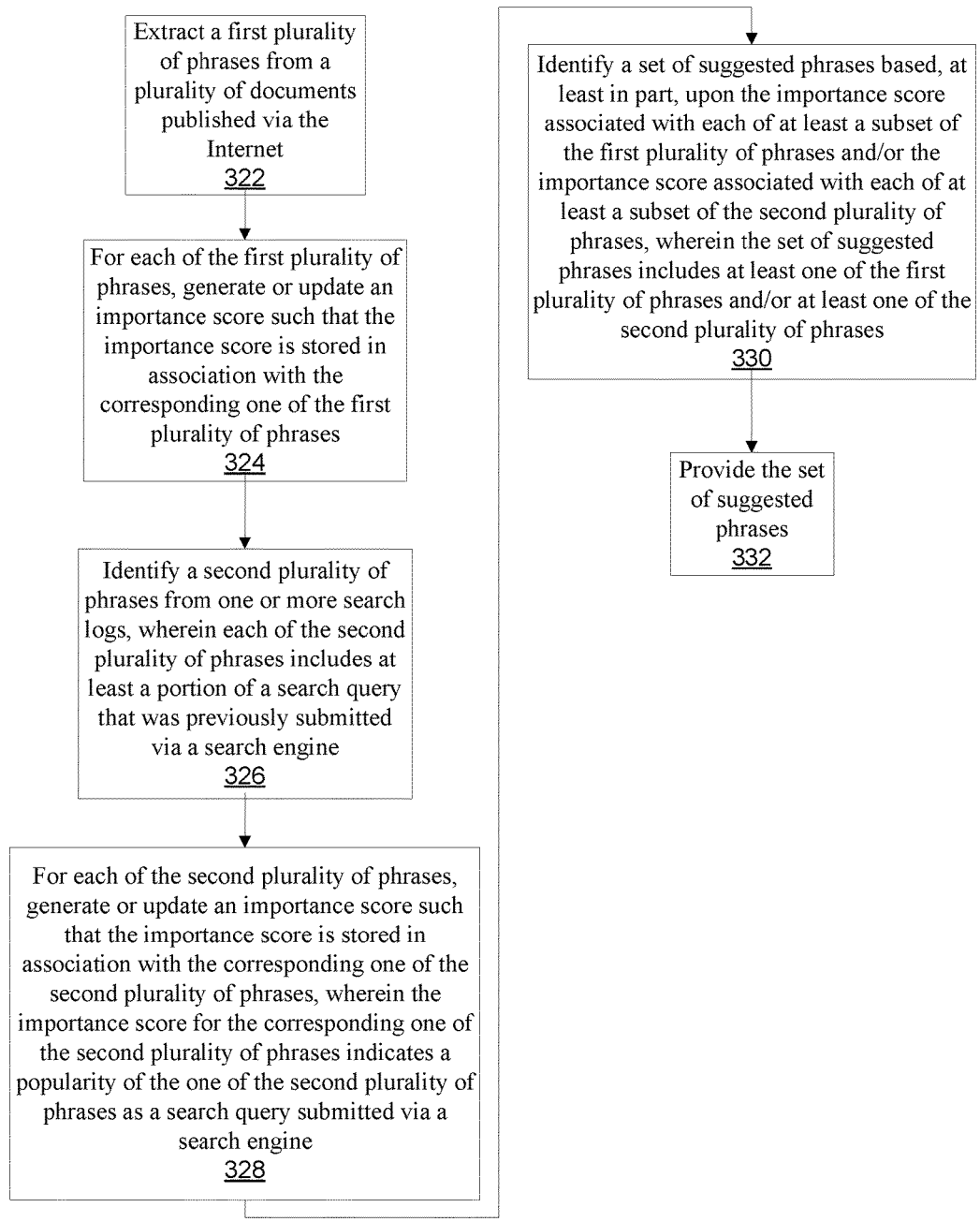
FIG. 3C is a process flow diagram illustrating another example method of providing suggested phrases in accordance with various embodiments.

FIG. 3C is a process flow diagram illustrating another example method of providing suggested phrases in accordance with various embodiments. A first plurality of phrases may be extracted from a plurality of documents published via a network such as the Internet at 322. For example, the plurality of documents may include news articles or magazine articles. Extraction of the first plurality of phrases from the plurality of documents may include identifying entities, noun phrases, and/or verb phrases within the documents.

An importance score for each of the first plurality of phrases may be generated or updated at 324 such that the importance score is stored in association with the corresponding one of the first plurality of phrases. More particularly, the importance score for a corresponding one of the first plurality of phrases may be generated based, at least in part, upon a number of the documents in which the phrase occurs, an importance of the documents in which the phrase occurs, and/or a number of occurrences of the phrase in each of the documents in which the phrase occurs.

A second plurality of phrases may be obtained from one or more search logs at 326, wherein each of the second plurality of phrases includes at least a portion of a search query that was previously submitted via a search engine. An importance score may be obtained at 328 for each of the second plurality of phrases such that the importance score is stored in association with the corresponding one of the second plurality of phrases. The importance score for a corresponding one of the second plurality of phrases may indicate a popularity of the one of the second plurality of phrases as a search query submitted via a search engine.

A set of suggested phrases may be identified at 330 based, at least in part, upon the importance score associated with each of at least a subset of the first plurality of phrases and/or the importance score associated with each of at least a subset of the second plurality of phrases, wherein the set of suggested phrases includes at least one of the first plurality of phrases and/or at least one of the second plurality of phrases. As described above, where a portion of a search query has been obtained (e.g., via a search box of a user interface), the set of suggested phrases may be identified based, at least in part, upon the importance score associated with each phrase of the subset of the first plurality of phrases and the subset of the second plurality of phrases for which the portion of the search query matches a portion (e.g., prefix) of the phrase. Accordingly, the portion of the search query may match a portion of each suggested search query in the set of suggested search queries.

In accordance with various embodiments, correlation scores associated with sets of two or more phrases may be ascertained and the set of suggested phrases may be identified based, at least in part, upon the correlation scores. More particularly, a set of two or more phrases having a high correlation score may be combined to generate a single suggested phrase. A set of two or more phrases may include at least one of the first plurality of phrases and/or at least one of the second plurality of phrases.

In one embodiment, for each of the first plurality of phrases, a boolean vector representing the phrase may be associated with the corresponding one of the first plurality of phrases, where the boolean vector includes a plurality of values, wherein each one of the plurality of values corresponds to one of the plurality of documents and indicates whether the one of the first plurality of phrases appears in the corresponding one of the plurality of documents. A correlation between pairs of phrases may be determined based upon their corresponding boolean vectors such that a correlation score for each of the pairs of phrases is generated, where each pair of phrases are phrases from the first plurality of phrases. More particularly, for each of the pairs of phrases, a cosine similarity between the corresponding boolean vectors may be calculated such that the correlation score for the corresponding one of the pairs of phrases is generated.

The set of suggested phrases may be generated based, at least in part, upon the correlation score for each of the pairs of phrases. For example, a pair of phrases having a high correlation score may be combined such that a single suggested phrase is generated. In addition, the set of suggested phrases may be generated based upon a set of rules, as discussed above.

The set of suggested phrases may be provided at 332. For example, the set of suggested phrases may be provided by a server to a client device.

Figure 4A:
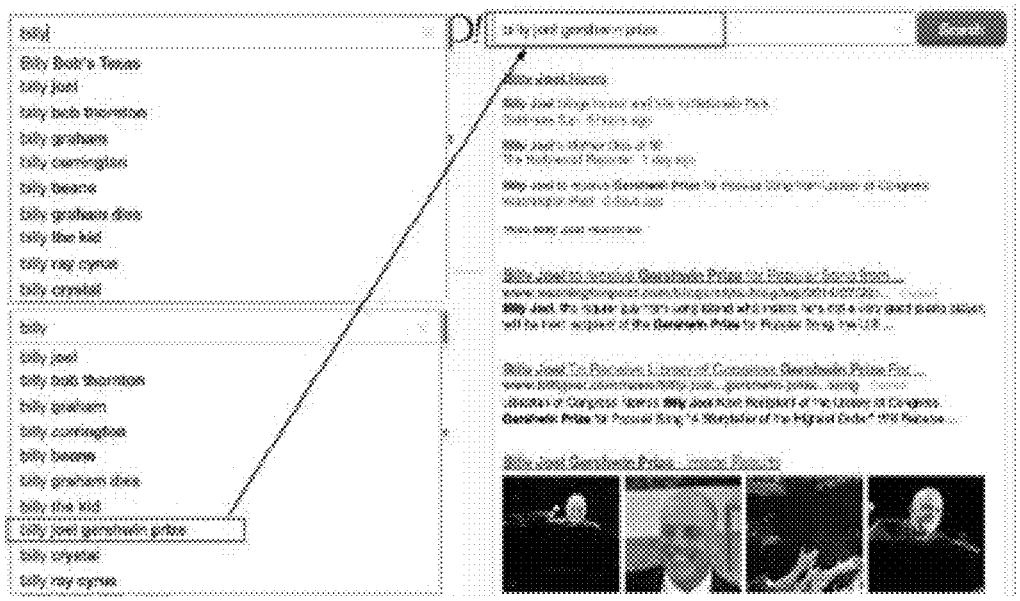
FIGS. 4A-4B together illustrate example applications of the disclosed embodiments.
Figure 4B:
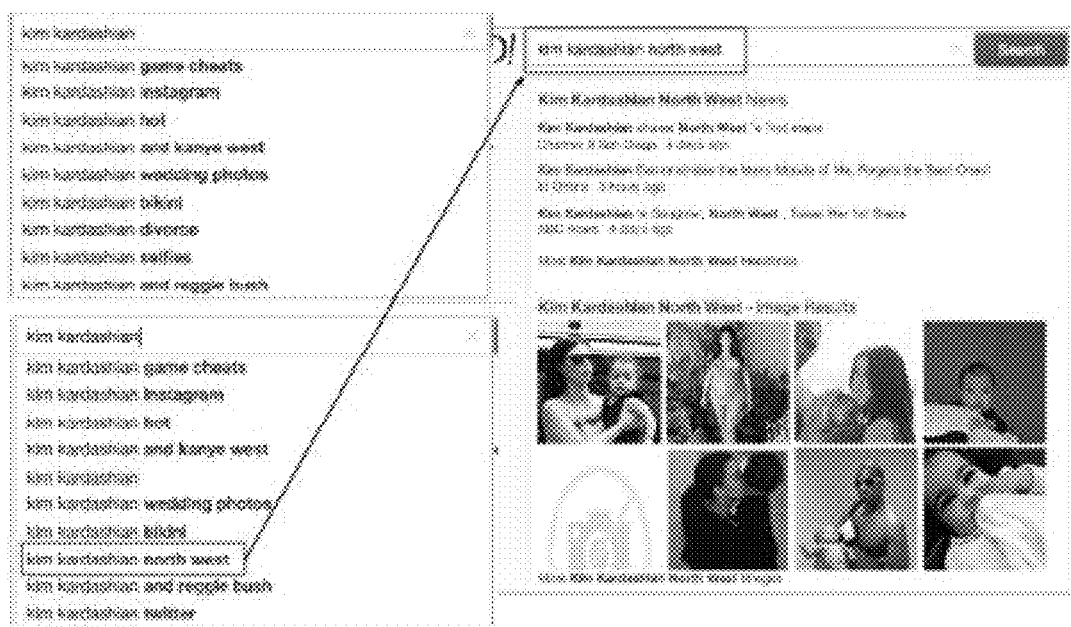

FIGS. 4A-4B together illustrate example applications of the disclosed embodiments. As shown in FIG. 4A, a user may type "billy" into a search portion of a user interface. Where suggested queries are generated based solely on search logs, the suggested queries "Billy Bob's Texas," "billy joel," "billy bob thornton," "billy graham," "billy currington," "billy beane," "billy graham dies," "billy the kid," "billy ray cyrus," and "billy crystal" are presented via the user interface, as shown in the upper portion of FIG. 4A. However, in accordance with various embodiments, where suggested queries are generated based upon both search logs and documents such as news articles published on the Internet, the suggested queries "billy joel," "billy bob thornton," "billy graham," "billy currington," "billy beane," "billy graham dies," "billy the kid," "billy joel gershwin prize," "billy crystal," and "billy ray cyrus" are presented, as shown in the lower portion of FIG. 4A. Thus, while the receipt of the gershwin prize by billy joel has not previously been submitted as a search query, the receipt of the Gershwin prize by billy joel is identified from a document published via the Internet and presented as a suggested search query. Accordingly, the disclosed embodiments enable suggested search queries to reflect current news stores and/or trending topics that cannot be captured via conventional search assist systems.

Similarly, as shown in FIG. 4B, a user may type "kim kardashian" into a search portion of the user interface. Where suggested queries are generated based solely on search logs, the suggested queries "kim kardashian game cheats," "kim kardashian instagram," "kim kardashian hot," "kim kardashian and kanye west," "kim kardashian wedding photos," "kim kardashian bikini," "kim kardashian divorce," "kim kardashian selfies," and "kim kardashian and reggie bush" are presented, as shown in the upper portion of FIG.

4B. However, in accordance with various embodiments, where suggested queries are generated based upon both search logs and documents such as news articles published on the Internet, the suggested queries "kim kardashian game cheats," "kim kardashian Instagram," "kim kardashian hot," "kim kardashian and kanye west," "kim Kardashian," "kim kardashian wedding photos," "kim kardashian bikini," "kim kardashian north west," "kim kardashian and reggie bush," and "kim kardashiann twitter" are presented, as shown in the lower portion of FIG. 4B. Thus, while "kim kardashian north west" has not previously been submitted as a search query, the name of Kim Kardashian's child "north west" may be identified in connection with Kim Kardashian from a document published via the Internet and presented as a suggested search query. Therefore, in accordance with the disclosed embodiments, at least a portion of a suggested search query may be identified based, at least in part, upon a document published via the Internet.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence.

A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
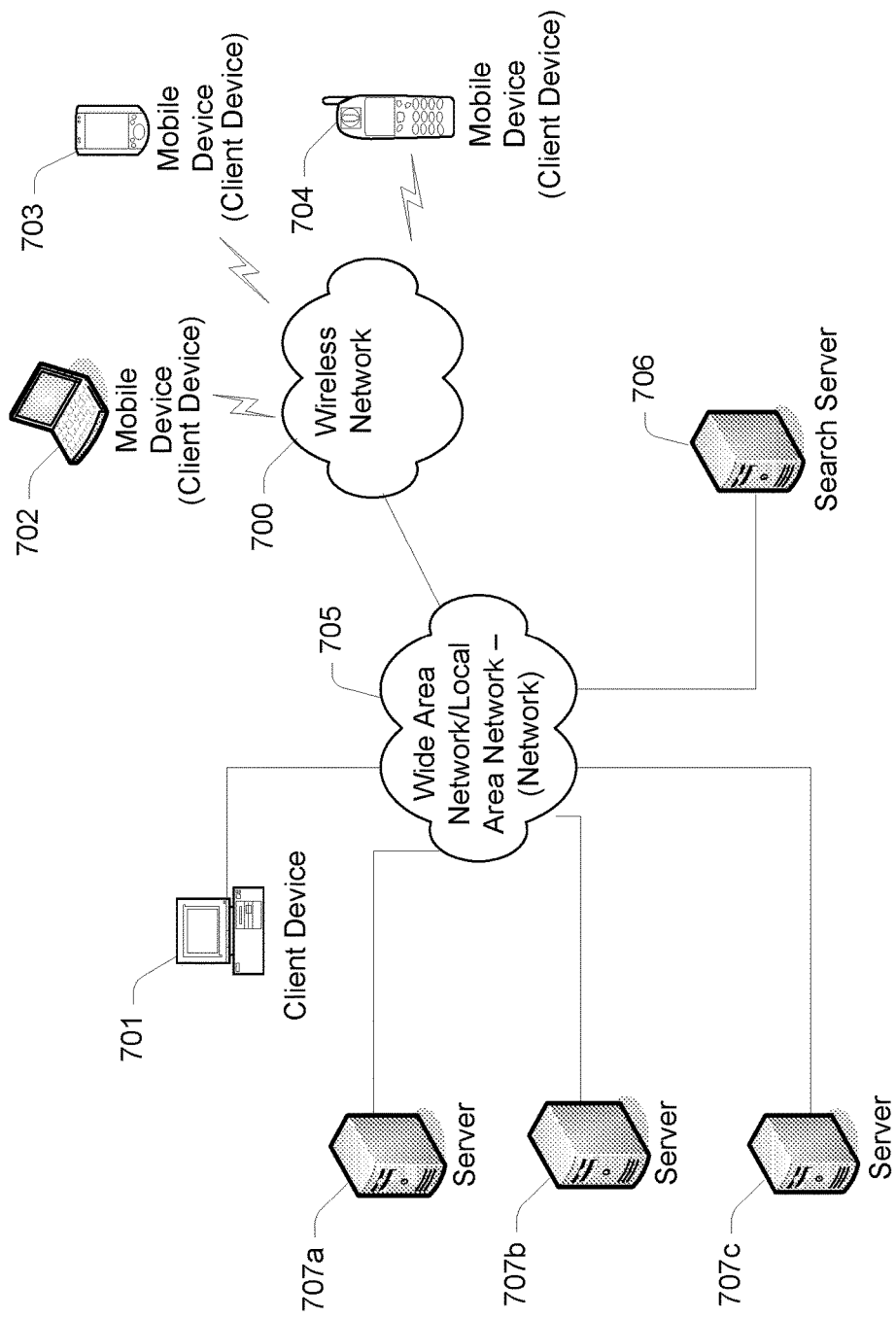
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter.

Implementations are contemplated in which users interact with a diverse network environment. As shown, FIG. 5, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
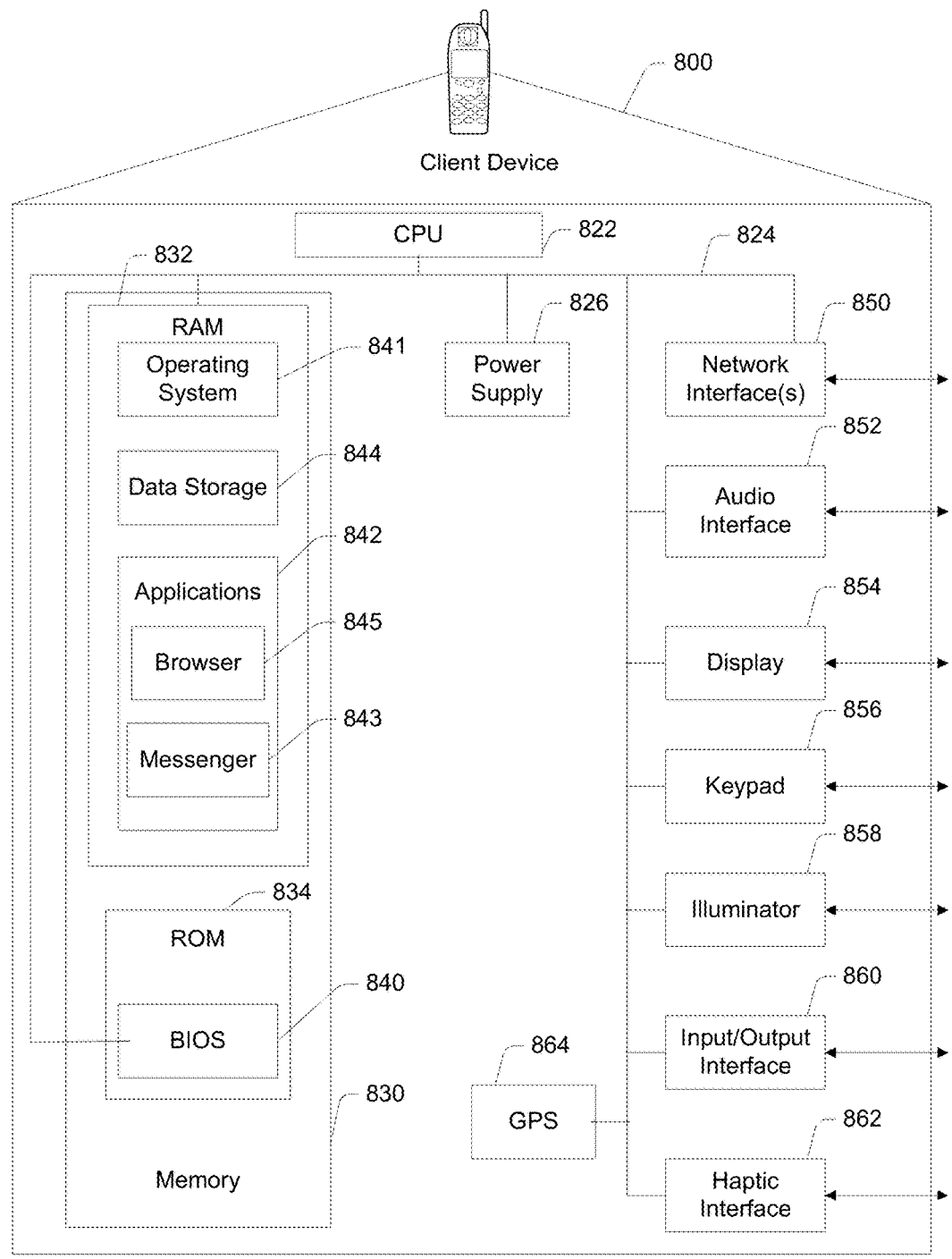
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 7:
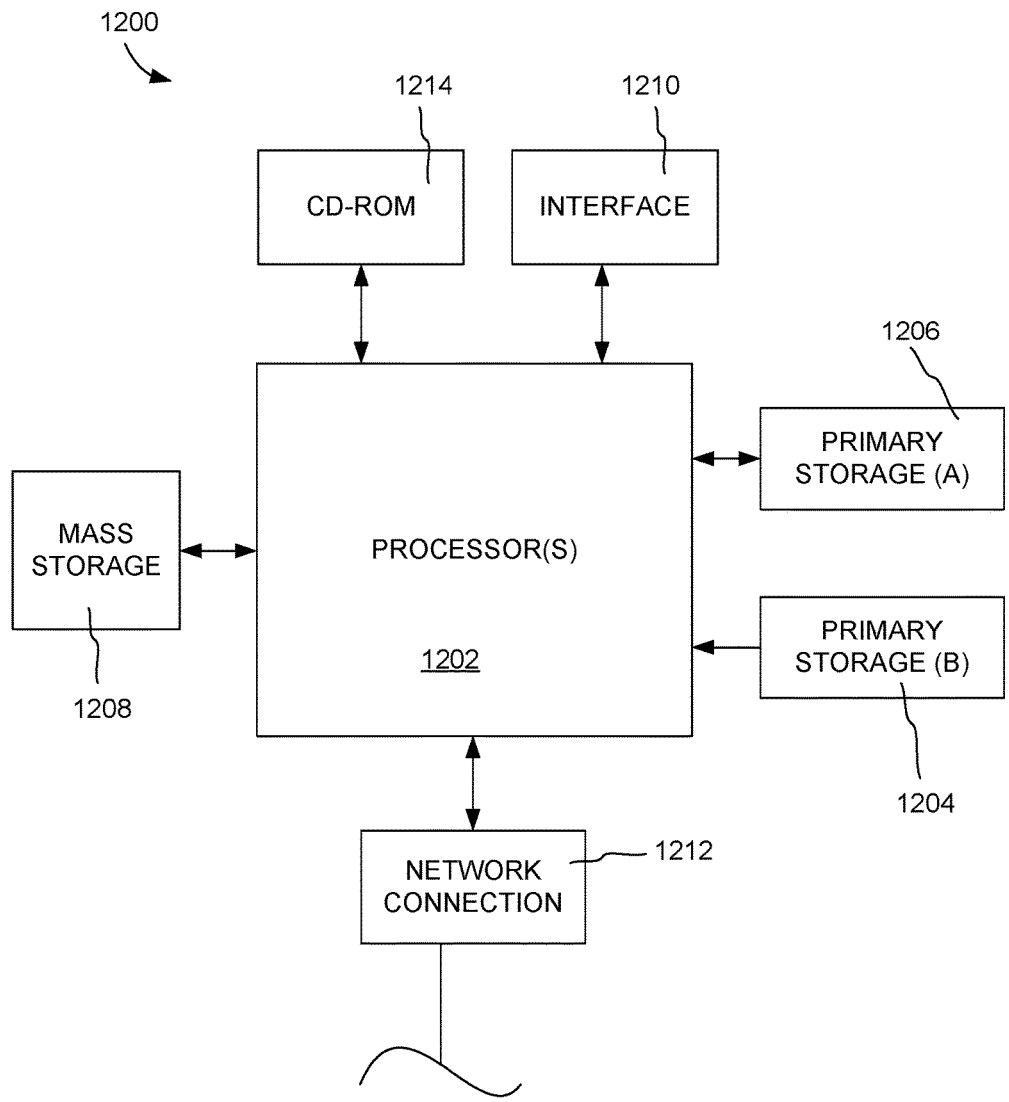
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   extracting a first plurality of phrases from a plurality of documents published via the Internet;
   for each of the first plurality of phrases, generating an importance score such that the importance score is stored in association with the corresponding one of the first plurality of phrases;
   identifying a set of suggested phrases based, at least in part, upon the importance score associated with each of at least a subset of the first plurality of phrases, wherein the set of suggested phrases includes at least one of the first plurality of phrases, wherein identifying a set of suggested phrases includes:
   for each of the first plurality of phrases, associating a boolean vector with the corresponding one of the first plurality of phrases, wherein the boolean vector includes a plurality of values, wherein each one of the plurality of values indicates whether the one of the first plurality of phrases appears in a corresponding one of the plurality of documents;
   determining a correlation between pairs of phrases based, at least in part, on corresponding boolean vectors such that a correlation score for each of the pairs of phrases is generated, each pair of phrases including phrases from the first plurality of phrases; and generating the set of suggested phrases based, at least in part, upon the correlation score for each of the pairs of phrases; and providing the set of suggested phrases.

2. The method as recited in claim 1, wherein the plurality of documents comprise news articles.

3. The method as recited in claim 1, wherein extracting the first plurality of phrases comprises:

identifying at least one of entities, noun phrases, or verb phrases within the documents published via the Internet.

4. The method as recited in claim 1, wherein generating the importance score for each of the first plurality of phrases comprises:

for each of the first plurality of phrases, ascertaining a number of the plurality of documents in which the one of the first one of the plurality of phrases occurs, wherein the importance score is generated or updated based, at least in part, upon the number of the plurality of documents in which the one of the first one of the plurality of phrases occurs.

5. The method as recited in claim 1, wherein the importance score, for each of the first plurality of phrases, is generated or updated based, at least in part, upon at least one of an importance of documents in the plurality of documents in which the one of the first plurality of phrases occurs or a number of occurrences of the one of the first plurality of phrases in each of the documents in which the one of the first plurality of phrases occurs.

6. The method as recited in claim 1, wherein determining a correlation between pairs of phrases based upon corresponding boolean vectors comprises:

for each of the pairs of phrases, calculating a cosine similarity between the corresponding boolean vectors such that the correlation score for the corresponding one of the pairs of phrases is generated.

7. The method as recited in claim 1, further comprising: receiving a portion of a search query;

wherein the set of suggested phrases is identified based, at least in part, upon the importance score associated with each phrase of the subset of the first plurality of phrases that includes the portion of the search query;

wherein the portion of the search query matches a portion of each suggested phrase in the set of suggested phrases.

8. The method as recited in claim 1, further comprising:

identifying a second plurality of phrases from one or more search logs, wherein each of the second plurality of phrases includes at least a portion of a search query that was previously submitted via a search engine;

for each of the second plurality of phrases, obtaining an importance score such that the importance score is stored in association with the corresponding one of the second plurality of phrases, wherein the importance score for the corresponding one of the second plurality of phrases indicates a popularity of the one of the second plurality of phrases as a search query submitted via a search engine;

identifying the set of suggested phrases based, at least in part, upon the importance score associated with each of at least a subset of the second plurality of phrases, wherein the set of suggested phrases includes at least one of the second plurality of phrases.

9. The method as recited in claim 8, wherein identifying a set of suggested phrases comprises:

combining two or more phrases such that a suggested phrase is generated, wherein the two or more phrases include at least one of the first plurality of phrases or one of the second plurality of phrases.

10. The method as recited in claim 8, wherein the set of suggested phrases is further identified based, at least in part, upon the importance score associated with each phrase of the subset of the second plurality of phrases that includes the portion of the search query.

11. The method as recited in claim 1, wherein the plurality of documents comprise blogs.

12. The method as recited in claim 1, wherein an importance score such that the importance score is stored in association with the corresponding one of the first plurality of phrases comprises:

generating an importance score such that the importance score is stored in association with the corresponding one of the first plurality of phrases.

13. An apparatus, comprising:

a processor; and a memory, at least one of the processor or the memory being configured to:

extract a first plurality of phrases from a plurality of documents published via a network;

for each of the first plurality of phrases, generate an importance score such that the importance score is stored in association with the corresponding one of the first plurality of phrases;

identify a set of suggested phrases based, at least in part, upon the importance score associated with each of at least a subset of the first plurality of phrases, wherein the set of suggested phrases includes one or more phrases from the first plurality of phrases, wherein identifying a set of suggested phrases includes:

for each of the first plurality of phrases, associating a boolean vector with the corresponding one of the first plurality of phrases, wherein the boolean vector includes a plurality of values, wherein each one of the plurality of values indicates whether the one of the first plurality of phrases appears in a corresponding one of the plurality of documents;

determining a correlation between pairs of phrases based, at least in part, on corresponding boolean vectors such that a correlation score for each of the pairs of phrases is generated, each pair of phrases including phrases from the first plurality of phrases; and generating the set of suggested phrases based, at least in part, upon the correlation score for each of the pairs of phrases; and provide the set of suggested phrases.

14. The apparatus as recited in claim 13, wherein extracting the first plurality of phrases comprises:

identifying at least one of entities, noun phrases, or verb phrases within the documents published via the network.

15. The apparatus as recited in claim 13, wherein generating the importance score for each of the first plurality of phrases comprises:

for each of the first plurality of phrases, ascertaining a number of the plurality of documents in which the one of the first one of the plurality of phrases occurs, wherein the importance score is generated or updated based, at least in part, upon the number of the plurality of documents in which the one of the first one of the plurality of phrases occurs.

16. The apparatus as recited in claim 13, wherein the importance score, for each of the first plurality of phrases, is generated based, at least in part, upon at least one of an importance of documents in the plurality of documents in which the one of the first plurality of phrases occurs or a number of occurrences of the one of the first plurality of phrases in each of the documents in which the one of the first plurality of phrases occurs.

17. The apparatus as recited in claim 13, wherein determining a correlation between pairs of phrases based upon corresponding boolean vectors comprises:
for each of the pairs of phrases, calculating a cosine similarity between the corresponding boolean vectors such that the correlation score for the corresponding one of the pairs of phrases is generated.

18. The apparatus as recited in claim 13, wherein identifying a set of suggested phrases comprises:
combining two or more phrases such that a single suggested phrase is generated.

19. A method, comprising:
obtaining a portion of a search query received from a client device;
obtaining or generating a set of suggested search queries from a plurality of phrases stored in memory, wherein the portion of the search query matches a portion of each suggested search query in the set of suggested search queries, wherein the plurality of phrases include phrases extracted from a plurality of documents published via a network, wherein obtaining or generating a set of suggested search queries includes:
for each of the plurality of phrases, associating a boolean vector with the corresponding one of the plurality of phrases, wherein the boolean vector includes a plurality of values, wherein each one of the plurality of values indicates whether the one of the plurality of phrases appears in a corresponding one of the plurality of documents;
determining a correlation between pairs of phrases based, at least in part, on corresponding boolean vectors such that a correlation score for each of the pairs of phrases is generated, each pair of phrases including phrases from the plurality of phrases; and
generating the set of suggested phrases based, at least in part, upon the correlation score for each of the pairs of phrases; and
providing the set of suggested search queries to the client device, each suggested query of at least a portion of the set of suggested queries including at least one of the phrases extracted from the documents published via the network.

20. The method as recited in claim 19, wherein the plurality of phrases further comprise phrases obtained from previously submitted search queries identified from a search log, wherein each suggested query in at least a portion of the set of suggested search queries includes at least one of the phrases obtained from the previously submitted search queries.

21. The method as recited in claim 19, wherein obtaining or generating the set of suggested search queries is performed based, at least in part, upon an importance score associated with each of the plurality of phrases, wherein the importance score associated with each of the phrases extracted from the documents is generated based, at least in part, upon at least one of a number of the documents in which the phrase occurs, an importance of the documents in which the phrase occurs, or a number of occurrences of the phrase in each of the documents in which the phrase occurs.

22. The method as recited in claim 19, wherein obtaining or generating the set of suggested search queries comprises:
combining two or more of the plurality of phrases such that a single suggested phrase is generated.

23. An apparatus, comprising:
a processor; and
a memory, at least one of the processor or the memory being configured to:
obtaining a portion of a search query received from a client device;
obtaining or generating a set of suggested search queries from a plurality of phrases stored in memory, wherein the portion of the search query matches a portion of each suggested search query in the set of suggested search queries, wherein the plurality of phrases include phrases extracted from a plurality of documents published via a network, wherein obtaining or generating a set of suggested search queries includes:
for each of the plurality of phrases, associating a boolean vector with the corresponding one of the plurality of phrases, wherein the boolean vector includes a plurality of values, wherein each one of the plurality of values indicates whether the one of the plurality of phrases appears in a corresponding one of the plurality of documents;
determining a correlation between pairs of phrases based, at least in part, on corresponding boolean vectors such that a correlation score for each of the pairs of phrases is generated, each pair of phrases including phrases from the plurality of phrases; and
generating the set of suggested phrases based, at least in part, upon the correlation score for each of the pairs of phrases; and
providing the set of suggested search queries to the client device, each suggested query of at least a portion of the set of suggested queries including at least one of the phrases extracted from the documents published via the network.

* * * * *